United States Patent [19]

Suzuki et al.

[11] Patent Number: 5,236,732
[45] Date of Patent: Aug. 17, 1993

[54] METHOD FOR PREPARING AN OIL-BASED SEASONED FOOD PRODUCT

[75] Inventors: Kazuji Suzuki, Osaka; Yasuo Ueda, Nara, both of Japan

[73] Assignee: Suntory Limited, Japan

[21] Appl. No.: 728,315

[22] Filed: Jul. 8, 1991

Related U.S. Application Data

[63] Continuation of Ser. No. 381,804, Jul. 19, 1989, abandoned.

[30] Foreign Application Priority Data

Jul. 21, 1988 [JP] Japan ................. 63-183144

[51] Int. Cl.$^5$ ............................................. A23L 1/39
[52] U.S. Cl. ................................. 426/589; 426/402; 426/410; 426/613; 426/615; 426/641
[58] Field of Search ............... 426/98, 310, 89, 106, 426/262, 293, 307, 324, 332, 333, 331, 465, 402, 410, 589, 615, 641, 643, 646, 613

[56] References Cited

U.S. PATENT DOCUMENTS

| | | | |
|---|---|---|---|
| 3,595,681 | 7/1971 | Kaplow et al. | 426/331 |
| 3,694,233 | 9/1972 | Kaplow et al. | 426/332 |
| 3,726,693 | 4/1973 | Harris | 426/310 |
| 3,769,042 | 10/1973 | Kaplow et al. | 426/326 |
| 3,958,021 | 5/1976 | Cook | 426/268 |
| 4,183,963 | 1/1980 | Brimelow et al. | 426/321 |
| 4,207,347 | 6/1980 | D'Atri et al. | 426/92 |
| 4,256,772 | 3/1981 | Shonbhog et al. | 426/331 |
| 4,537,785 | 8/1985 | Nichols | 426/332 |
| 4,746,524 | 5/1988 | Meyer | 426/330 |
| 4,904,493 | 2/1990 | Petrizelli | 426/549 |

FOREIGN PATENT DOCUMENTS 4150 of 1817 United Kingdom ............... 426/310

*Primary Examiner*—Arthur L. Corbin
*Attorney, Agent, or Firm*—Ronald P. Kananen

[57] ABSTRACT

Food products for long storage at room temperature are prepared by a process of: drying food ingredients until the water content thereof is less than 15 wt %, heating fats and/or oils which form solids or semi-solids at room temperature until the contents are melted completely whereupon the contents are then cooled to prepare a fatty liquid, impregnating the fatty liquid into the dried ingredients and sealing the products in small packages. The water activity of the products is regulated in a range of 0.55 to 0.75 in order to inhibit the generation of microorganisms.

2 Claims, No Drawings

METHOD FOR PREPARING AN OIL-BASED SEASONED FOOD PRODUCT

This application is a continuation of application Ser. No. 07/381,804 filed Jul. 19, 1989, now abandoned.

BACKGROUND OF THE INVENTION

1. Technical Field

This invention relates to food products utilized in instant cooking having the ability to be stored for long periods without need of high temperature sterilization. Specifically, this invention relates to oil impregnated food products which retain the material color and flavor of their raw ingredients.

2. Background Art

Methods of producing keepable sterilized and sealed foods such as canning, bottling and retorting have been utilized broadly over the last 150 years and have been applied to fruits, vegetables, meat, marine products, and cooked products and so on as safety foods. They can be distributed at room temperature because microbiological resistance and sterility makes it possible to store them for a long period of time at room temperatures.

In sterilized and sealed foods such as the above mentioned, keepability is definitely influenced by whether or not the sterilization after sealing is perfect. Generally, the means for sterilization utilized in the industrial field is wet heating sterilization by vapor. It is used for the purpose of establishing sanitary conditions by making extinct all toxic and nontoxic microorganisms that are generatable in foods under storage without cooling or generatable while under distribution.

Suitable heating conditions for the above mentioned are varied by the pH and water activity of the products, heat resistance of microorganisms, packaging size and the physical properties of the foods. Particularly, pH and water activity are influential elements for microorganisms generation. Acid foods having a pH of less than 4.6 such as canned fruits are low temperature sterilized at temperatures less than 100° C., and low acid foods having pH in a range of 4.6 to 8.0 such as canned marine products are high temperature sterilized at temperatures more than 100° C. It is well known that the generation of microorganisms which can decompose canned foods are commanded by water activity at a border value of 0.93 or 0.4.

According to the Food Sanitation Act of Japan, it is necessary to apply heat sterilization of at least 120° C. for 4 min. (this is necessary for die out botulism bacillus) when producing food products having a pH of more than 5.6 and water activity of more than 0.4. Most canned foods are wet, low acid foods having water activity of more than 0.94 with pH values in a range of 4.6 to 8.0. Therefore, they need heat sterilization as described above. However, when using perishable materials characterized by fresh flavor and vivid color, heat sterilization causes several problems. That is to say, denaturation of protein and decomposition of pigment occur as a result of heat sterilization; this and other influences damage the raw material's precious flavor and color. Therefore, supplying these kinds of food products in canned form under room temperatures is very difficult.

Japanese Patent First Publication No. 59-34874 discloses a method for producing food products by adding ethylalcohol to pastes after cooking. Japanese Patent First Publication No. 61-31930 and No. 63-279770 disclose methods for producing sauce or suspension by cooling suddenly and kneading a mixture of molten oils by heating and an added emulsifying agent. U.S. Pat. No. 4,746,524 discloses a method for producing food products by adjusting the pH while also adjusting the water activity of the ingredients of the food products. U.S. Pat. No. 3,769,042 discloses a method for making food products by immersing solid pieces in a liquid phase gravy or sauce comprising an aqueous solution of stabilizing solutes to infuse a portion of the solutes into the solids phase to the extent of reducing water activity of the solids phase to a level ranging from about 0.6 to 0.9 and forming a surrounding liquid phase gravy to have residual stabilizing solutes such that water activity of the liquid phase differs from the water activity of the solids phase by less than 0.1.

Though food products produced by the above mentioned methods have resistance to microorganisms and relative long storage ability and retaining materials' flavor thereof, further storage ability at room temperatures and restoration ability are needed. Additionally, food products for instant cooking by mixing thereof with materials such as boiled noodles and rice using oil for cooking is needed.

It is well known that lowering the water activity of products inhibits generation of microorganisms as previously mentioned for long storage. Products that are merely dried are different from the raw materials before drying in flavor, color, taste and so on. It is also well known that storage methods such as salting, pickling, miso pickling, sweetening and so on greatly change the material's taste. Therefore, these methods of raising osmotic pressure can be applied for only certain types of food products.

In light of the above-mentioned background, it is the object of this invention to provide new food products for instant cooking which retain the raw ingredient's natural flavor and color and methods of producing same.

It is another object of this invention to provide new food products which can be stored for long periods of time at room temperatures and methods of producing same.

It is a further object of this invention to provide new food products without sterilizing at high temperatures and methods of producing same.

SUMMARY OF THE INVENTION

This invention takes advantage of the properties of oil. Properties that provide a coating which cannot be oxidized easily and can provide moisture to dried materials.

Raw materials such as fruits, vegetables, meat, and marine products are dried until the materials have less than or equal to 15wt % of water in them. A fatty liquid such as fats and/or oils which form solids or pastes (semisolids) at room temperatures is heated and melted, then cooled to a temperature less than or equal to 60° C. After the cooling of the fats and oils, dried materials are added and mixed. At this stage, the product's water activity is regulated in a range of 0.55 to 0.75. When these products are completed, they are sealed in appropriate packaging.

According to this invention, a method for producing flavorful and colorful products keeping the properties of their raw materials without sterilizing at high temperatures can be provided. They can be stored for long periods of time at room temperatures because of the substitution of oil for moisture and can obtain relative stability against moisture or oxidation. This has not been realized by prior arts such as canning or retorting foods. Food produced according to the invention contains plenty of fat and oil of its own, and the invention has extensive utility in producing sauces or other ingredients using oil for cooking. By applying this invention, the variety of easily available foods, convenient in preparation and storage, can be greatly increased.

DETAILED DESCRIPTION OF THE PREFERRED EMBODIMENT

The following discussion concerns the details of the preferred embodiment according to the present invention The invention includes food products which retain the flavor and color of their raw materials at room temperature for long periods of time. The products are impregnated with oil, and water activity thereof is regulated in a range of 0.55 to 0.75.

Water activity (hereinafter referred to as Aw) is the unit which indicates the presence of water in foods can be described by the following formula:

$$Aw = P/Po$$

(P:vapor pressure of food, Po:vapor pressure of pure water)

In food products produced according to the present invention, Aw is determined in a range of 0.55 to 0.75 because generation of microorganisms cannot be substantially prevented when Aw is more than 0.75. Additionally, at room temperature storage, there is a possibility of pollution not only by yeasts or molds but also by halophilic bacteria when Aw is more than 0.75.

If Aw is less than the maximum value as mentioned above, keepability is obtained much like ordinary keepable foods sterilized at room temperatures (less than 100° C.) but without losing its raw flavor. On the other hand, if Aw is less than 0.55, salt, sugar or other sweetening agents, polyalcohols and chemical seasonings utilized in cooking cannot be dispersed uniformly in the material. Therefore, in an industrial process, clogging occurs in packing systems. Furthermore, when using small packages such as aluminum pouches, crystals of the added seasonings cause poor sealing or leaking of the liquid in the package. In order to prevent the occurrence of these disadvantages, there is the method of previously pulverizing such materials. However, these particles absorb small quantities of water in the reaction system and form crystal-like blocks having a diameter of more than 2 mm which are called "blocking". Therefore, it causes packing difficulty and besides it has an unpleasant texture in the mouth because of this crystallization.

Therefore, foods which are impregnated with oil can promote fluidity of liquid in a package and concurrently cause no blocking when Aw is determined more than 0.55.

According to the previously mentioned considerations, in the present invention, raw materials having nearly 1.0 of Aw are dried until less than 15 wt % of water remains in order to obtain the above-mentioned range of Aw. Then these materials are impregnated with molten fats and oils forming solids or pastes (semi-solid) at room temperatures. By this process, fats and oils are absorbed by the dried materials in place of water, and by this process, the raw flavor of the materials can be restored. The method for drying is not specifically limited and may be such as hot-air drying, freeze-drying, far infrared-drying or so on. Drying is generally performed so as to leave less than 10 wt % of water in the materials, because if it difficult to lower the Aw below 0.75 when water in the materials in more than 15 wt %, and the total wt % may be slightly changed by the amount of added seasonings. On the other hand, small amounts of water may be added in order to regulate Aw when the materials are overdried or the Aw of the materials becomes less than 0.55 due to the adding of small amounts of seasonings.

Materials which can be utilized in the present invention are all eatable solids which are derived from animals or plants. Generally, beef, pork, chicken, eggs, fish, roe, shellfish, shrimp, crab, vegetable mixtures containing bamboo shoots or duo, fuits, nuts, spices, whole or parts of sea weeds and dairy products such as cheese are utilized as materials.

Fats and oils in the form of solids or pastes are used at room temperatures as base agents in the present invention. Edible animal and plant oils such as palm, cottonseed, rape, peanut, sesame, palm core, almond, bean, safflower, sunflower, tallow, lard, or a separation of these oils, random ester exchanged oil, hardened oil or a blend of same, and oil products such as butter, margarine, shortening or so can be used.

Fats and oils having a low exchange of density by temperature are preferable. This is indicated by an SFI (solid fat index) line crossing the temperature axis as perpendicularly as possible. Margarine which is solid on market is preferable in the light of the object of the invention because its density exchange is regulated by temperatures as small as possible by ester exchange, and so forth. However, margarine containing natural butter contains a considerable amount of water, so consideration of the water content is necessary when utilizing this type of margarine.

On the other hand, mixtures of liquid oil such as salad oil and paste fats such as middle m.p. fractions of palm oil can provide the desired density without consideration of water containment.

In order to impregnate fats and oils as mentioned into the dried materials, the materials are added to liquid fats and oils under temperature conditions of less than 60° C., then mixed until they are dispersed sufficiently. By this process, fats and oils are impregnated into the tissue structure of the materials and restores their flavor and color. In the present invention, besides the materials and oils as previously mentioned, seasonings such as salt and sugar, many kinds of spices and flavorings can be added to taste for the purpose of controlling the flavor of the food products. These seasonings may be added to the ingredients before drying or during the impregnation period.

Additionally, small amounts of a natural or synthetic antioxidant can be added to inhibit formation of peroxide due to the oxidation of the fats and oils.

The food products of the present invention have long keepability. They are not denatured or decomposed while being stored and do not oxidize suddenly or absorb moisture because the materials are surrounded by fat and oil. However, in order to prevent pollution or moisture absorption through dusts in the air, the products are preferably wrapped lightly using materials such as cellophane having moistureproof properties. Furthermore, even with when fat and oil surround the materials, this coating will oxidize over very long periods of time. Therefore, the products should be sealed and packed in long terms storable casings such as cans, bottles or aluminum pouches. In this case, high temperature sterilizing is not necessary, but if desired, low temperature sterilizing may be performed. Furthermore, when low temperature sterilizing is performed, vacuum treating or heat-packing at low temperature can be performed as desired.

EXAMPLES

The following examples are disclosed for the purpose of giving a more detailed description, not to limit the scope of the present invention.

EXAMPLE 1

Japanese style spaghetti sauce "mentaiko" (cod or pollack roe in red pepper sauce)

50 kg of palm oil and 18 kg salt-free butter were and mixed then heated and stirred into a kneader (of the steam heated, water cooled type) until the oil and butter were melted completely. After melting, 29 kg of cottonseed oil and 0.5 kg of butter flavoring and the same amount of cod roe flavoring were added and mixed uniformly. Then the mixture was cooled by stirring until the temperature became less than 15° C.

12 kg of chemical seasoning, 40 kg of pure salt, 35 kg of granulated sugar and 55 kg of raw pollack roe in red pepper sauce (dried by hot air at 80° C. for 3 hours at which water content was regulated to 7 wt. %) was added to the previously mentioned mixed oil.

Furthermore, 25 kg of water was added to this mixture and then stirred and mixed until all the ingredients were dispersed in the oil mixture completely.

The obtained sauce was packed and sealed into small aluminum pouches using a small-package machine, each containing 15 g of sauce.

Delicious Japanese style spaghetti having the flavor, color and taste of raw pollack roe was obtained when boiled spaghetti was dressed with this packed sauce.

The measured Aw of the sauce of this example is shown in Table 1.

EXAMPLE 2

Genoese style basic sauce for paste 70 kg of palm oil and 50 kg of salt-free butter were mixed in the kneader and then heated and melted. After the mixture melted completely, 20 kg of olive oil was added and mixed uniformly and the mixture was cooled by stirring until the temperature became less than 35° C.

10 kg of chemical seasoning, 45 kg of pure salt, 38 kg of granulated sugar, 22 kg of freeze-dried raw basil in which the water content was regulated to 4 wt. % and 20 g of pine seeds chopped into 2 mm squares were added to the mixed oil. Furthermore, 25 kg of water was added then stirred and mixed until the all materials were dispersed in the oil mixture completely. Then, packing and sealing in aluminum pouches was done, each pouch containing 15 g of sauce, a Genoese type basil sauce for pasta were obtained.

When sampling boiled spaghetti dressed with this sauce, the flavor and color of the basil was restored excellently.

The Aw of measured this sauce is shown in Table 1.

EXAMPLE 2

Chinese dish of fried rice with roast port 30 kg of lard, 40 kg of beef fat, and 35 kg of salad oil were mixed in a direct boiling style pot with a mixer, then heated and melted until all ingredients were melted completely. After a uniform dispersion was completed, the mixture was cooled by stirring until the temperature became less than 40° C.

36 kg of chemical seasoning, 50 kg of pure salt, 25 kg of granulated sugar, 18 kg of freeze-dried roast pork cubed to 5 mm size in which water content was regulated to 5 wt. % and the same amount of dried onion also cubed to 5 mm size in which water content was regulated to 7 wt. % was added to the mixed oil and fat. Then furthermore, 40 kg of water was added and stirred until the all materials were dispersed in the oil mixture completely.

The obtained stock was packed and sealed into aluminum pouches of 10 g each by a small package machine.

A dish of Chinese fried rice with fully restored roast pork flavor and natural vegetable taste was obtained when frying cold rice with this stock.

The measured Aw of this stock is shown in Table 1.

EXAMPLE 4

Sauce of chow mein with ingredients 50 kg of lard, 50 kg of salad oil and 20 kg of salt-free butter were added in a direct boiling style pot then heated and melted until all materials were melted completely. Afterward, the molten mixture was moved into a pan with a mixer, then cooled by stirring until the temperature became less than 30° C.

5 kg of beef particles extract, 5 kg of chemical seasoning, 45 kg of pure salt, 25 kg of sugar, 10 kg of freeze-dried (according to the usual method) pork cubes of 5 mm size in which water content was regulated to 12 wt. %, 5 kg of dried cabbage cut in desired size in which water content was regulated to 10 wt %, 2 kg of green layer, 1 kg of dried ginger cubed to a 10 to 20×2×2 mm size in which water content was regulated to 8 wt. % and 30 kg of Worchestershire sauce were added to the previously mentioned mixed oil.

Then the mixture was stirred and mixed until all materials were dispersed in the oil mixture completely.

The obtained sauce was packed and sealed into aluminum pouches of 20 g each by a small-package machine.

A chow mein with ingredients having good flavor was obtained when the sauce was melted completely in a frying pan and fried with raw mein for chow mein over medium heat for 3 min.

The measured Aw of this sauce is shown in Table 1.

TABLE 1

| Example No. | 1 | 2 | 3 | 4 |
| --- | --- | --- | --- | --- |
| Aw | 0.57 | 0.60 | 0.72 | 0.68 |

Several combinations arrangements of ingredient ratios for Examples 1 and 2 were performed in the laboratory scale.

The results are shown in Tables 2 and 3.

TABLE 2

| Materials (kg) | Other combinations of Example 1 | | | | |
| --- | --- | --- | --- | --- | --- |
| | Combinations | | | | |
| | A | B | C | D | E |
| Dried pollack roe | 21 | 21 | 21 | 21 | 21 |
| Palm oil | 20.4 | 19.4 | 19.8 | 18.8 | 17.8 |
| Cottonseed oil | 11 | 11 | 11 | 11 | 11 |
| Salt-free | 6.8 | 6.8 | 3.4 | 3.4 | 3.4 |

TABLE 2-continued

| Materials (kg) | Other combinations of Example 1 Combinations | | | | |
|---|---|---|---|---|---|
| | A | B | C | D | E |
| butter | | | | | |
| Butter flavoring | 0.2 | 0.2 | 0.2 | 0.2 | 0.2 |
| Cod roe flavoring | 0.2 | 0.2 | 0.2 | 0.2 | 0.2 |
| Pure salt | 20 | 15 | 15 | 15 | 15 |
| Granulated sugar | 13 | 13 | 13 | 13 | 13 |
| Chemical seasoning | 4.4 | 4.4 | 4.4 | 4.4 | 4.4 |
| White wine | — | — | 10 | — | — |
| Water | 3 | 9 | 2 | 13 | 18 |
| Sum (kg) | 100 | 100 | 100 | 100 | 100 |
| Occurrence of blocking | Y | N | N | N | N |
| Aw | 0.52 | 0.57 | 0.65 | 0.70 | 0.82 |
| Generation of mold or yeast* (/ml) | <300 | <300 | <300 | <300 | $2.5 \times 10^7$ |

*Results of culture tests in a potato-dextrose agar medium for 25° C. 72 hours after storage of each sample at 25° C. for 3 months.

TABLE 3

| Materials (kg) | Other combinations of Example 2 Combinations | | | | |
|---|---|---|---|---|---|
| | F | G | H | I | J |
| Pine seeds | 20 | 20 | 20 | 20 | 20 |
| Dried basil | 22 | 22 | 22 | 22 | 22 |
| Palm oil | 90 | 85 | 70 | 62 | 55 |
| Olive oil | 20 | 20 | 20 | 20 | 20 |
| Salt-free butter | 50 | 50 | 50 | 50 | 50 |
| Pure salt | 45 | 45 | 45 | 45 | 45 |
| Granulated sugar | 38 | 38 | 38 | 38 | 38 |
| Chemical seasoning | 10 | 10 | 10 | 10 | 10 |
| White wine | — | 10 | — | — | — |
| Water | 5 | — | 25 | 33 | 40 |
| Sum (kg) | 300 | 300 | 300 | 300 | 300 |
| Occurrence of blocking | Y | Y | N | N | N |
| Aw | 0.49 | 0.53 | 0.66 | 0.71 | 0.78 |
| Generation of mold or yeast* (/ml) | <300 | <300 | <300 | <300 | $7.0 \times 10^7$ |

*Results of culture tests in a potato-dextrose agar medium for 25° C. 72 hours after storage of each sample at 25° C. for 3 months.

Referring now to Tables 2 and 3, blocking of products occurred when Aw was less than 0.55. On the other hand, mold or yeast was generated when Aw was more than 0.75. Therefore, the ingredient ratios can be varied without departing from an Aw range between 0.55 and 0.75.

Although this invention has been shown and described with respect to detailed embodiments thereof, it will be understood by those skilled in the art that various changes in form and detail thereof may be made without departing from the spirit and scope of the claimed invention.

What is claimed is:

1. A method for forming an oil-based seafood food product comprising the steps of:
    reducing the water content of food materials to less than or equal to 15 wt. %,
    melting fats and/or oils which form a solid and/or a semi-solid at room temperature,
    cooling said fats and/or oils to a temperature less than or equal to 60° C.
    mixing said fats and/or oils with said materials and adding seasonings thereto to prepared a product at a temperature such that said materials and said seasonings are uniformly dispersed in said fats and/or oils and said materials are sufficiently impregnated with said fats and/or oils,
    regulating the water activity of said product to be in the range of 0.55 to 0.75,
    cooling said product to a storage temperature, and then
    packaging said product into a container to be sealed to ensure storage ability of said product.

2. The method as set forth in claim 1, wherein said fats and/or oils are heated to melt completely before cooling thereof.

* * * * *

UNITED STATES PATENT AND TRADEMARK OFFICE
CERTIFICATE OF CORRECTION

PATENT NO. : 5,236,732
DATED : August 17, 1993
INVENTOR(S) : Kazuji Suzuki, et al It is certified that error appears in the above-indentified patent and that said Letters Patent is hereby corrected as shown below:

Column 8, Claim 1, line 1, "seafood" should be --seasoned--.

Signed and Sealed this

Twenty-ninth Day of March, 1994

Attest:

BRUCE LEHMAN

Attesting Officer

Commissioner of Patents and Trademarks